United States Patent [19]
Gibbs

[11] 4,342,513
[45] Aug. 3, 1982

[54] EASEL BOARD USED IN PHOTOGRAPHIC PRINTING

[76] Inventor: Frankie U. Gibbs, 64 Division Ave., Blue Point, N.Y. 11715

[21] Appl. No.: 128,397

[22] Filed: Mar. 10, 1980

[51] Int. Cl.³ .............................................. G03B 27/58
[52] U.S. Cl. ......................................... 355/74; 355/54
[58] Field of Search ..................... 355/73, 74, 40, 55, 355/75, 54

[56] References Cited
U.S. PATENT DOCUMENTS

| | | | |
|---|---|---|---|
| 1,900,651 | 3/1933 | Koenig et al. | 355/74 |
| 2,246,920 | 6/1941 | Kromholz | 355/74 |
| 2,770,165 | 11/1956 | Vriezelaar | 355/54 |
| 3,588,248 | 6/1971 | Freund et al. | 355/74 |
| 3,667,844 | 6/1972 | Pittman | 355/74 |
| 3,677,638 | 7/1972 | Daugherty | 355/74 |

Primary Examiner—Richard A. Wintercorn
Attorney, Agent, or Firm—Pennie & Edmonds

[57] ABSTRACT

Three easel boards having cut outs and positioning means thereon are provided by which a sheet of photo paper may be positioned in order to provide fifteen print patterns on the sheets when exposed.

11 Claims, 20 Drawing Figures

FIG. 5

EASEL BOARD USED IN PHOTOGRAPHIC PRINTING

TECHNICAL FIELD

The invention relates to easel boards used with a sheet of photo paper where a number of photographic prints having different sizes may be made from a single sheet of photo paper having standard size dimensions.

BACKGROUND ART

Photo paper is usually purchased in standard size sheets having dimensions, as for example, 8" by 10". Prints made from such sheets usually include the standard sizes of 8" by 10", 5" by 8", 4" by 5", 4" by 10" and 2½" by 4". It is desirable in order to reduce costs that all of a standard 8" by 10" sheet by utilized even when making a variety of different sized prints from the same sheet of photo paper.

Easel boards have been proposed in the past for masking or blocking off portions of a standard size sheet in order that prints of various sizes might be made from the sheet. Such easel boards when included in a copying apparatus have usually involved moving parts making them expensive to make and difficult to use in a darkroom where visibility is at a minimum. Further among each boards as used in the past have not provided any way in which identifying information, such as exposure time, film type or dates might readily be marked on the back of a print at the time the print was made.

Easel boards used to date have not provided for a sufficient margin between prints appearing on the same sheet of photo paper such that when the prints are cut from the sheet, often a portion of the photograph reproduced is also cut or damaged.

It is therefore an object of my invention to provide for an easel board construction which is inexpensive to make, which may readily be used such that a variety of different sized prints can be made from a standard size sheet of photo paper and which may easily be used in a darkroom under minimum light conditions. At the same time it is a further object of the invention to provide for an easel board arrangement which will assure margins appearing between adjacent prints on a sheet of photo paper in order that the prints may be cut from the paper without destroying or marring individual photographs.

DISCLOSURE OF INVENTION

Broadly I provide for three easel boards which may be used with a standard size sheet of photo paper from which fifteen possible different print arrangements may be made. Where the sheet is of a standard 8" by 10" size, the size of the different prints may be 5" by 8", 4" by 5", 4" by 10" and 2½" by 4". All three of the easel boards utilized have a longitudinal length which is greater than the longitudinal length L of the standard size sheet and have a lateral width which is greater than the lateral width W of the standard size sheet. One of the boards has a cut out in one corner thereof having a dimension which is equal to substantially one-half the longitudinal length of the board times substantially the lateral width of the board. At least two sheet positioning means are included at the uncut corners of the board on both sides thereof either adjacent the lateral edge of the board or adjacent the longitudinal edge of the board. If the positioning means are adjacent the lateral edge of the board, they are separated a distance W from each other, and if located adjacent the longitudinal edge of the board, they are separated a distance L from each other. By placing the sensitive side of a sheet on the board and positioning the sheet by the positioning means, one corner of the sheet overlying the cut out may be exposed when the board and attached sheet are turned so that the sensitive side of the sheet faces an image source. Other corner areas of a sheet may be imaged by turning the board with respect to the sheet or by applying the sheet to the back side of the board.

This board in addition has further sheet positioning means on both the front and back sides. The further sheet positioning means on the front side of the board are located a distance substantially one-half L from the lateral edge of the board opposite the cut out such that a portion of a sheet having a dimension substantially W times one-half L may overlie an end of the board and be exposed. The further positioning means on the back side of the board are positioned approximately one-half W from the longitudinal edge of the board opposite the cut out in order that a sheet may be positioned on the board such that a portion approximately L times one-half W may extend over the edge of the board to be exposed.

In addition I provide for a second easel board having the same overall dimensions as the aforementioned easel board and which has a cut out in one corner of the board having the dimensions approximately one-half the lateral width of the board times one-quarter the lateral length of the board. Positioning means are included on both sides of the board whereby a sheet may be positioned such that a corner of the sheet overlies the cut out in the corner of the board.

In addition I provide for a still further third board having the same general overall dimensions as the first two boards but which includes a cut out extending along one longitudinal edge of the board where the cut out has the dimensions of approximately one-half the lateral width of the board times approximately one-quarter the longitudinal length of the board. Positioning means are provided on both sides of the board whereby a sheet may be positioned to extend over the cut out.

By applying sheets to the various boards, turning the boards relative to the sheets and by utilizing both sides of the boards, fifteen print arrangements may be provided on a sheet of photo paper having standard size.

BEST MODE FOR CARRYING OUT THE INVENTION

Figure 1:
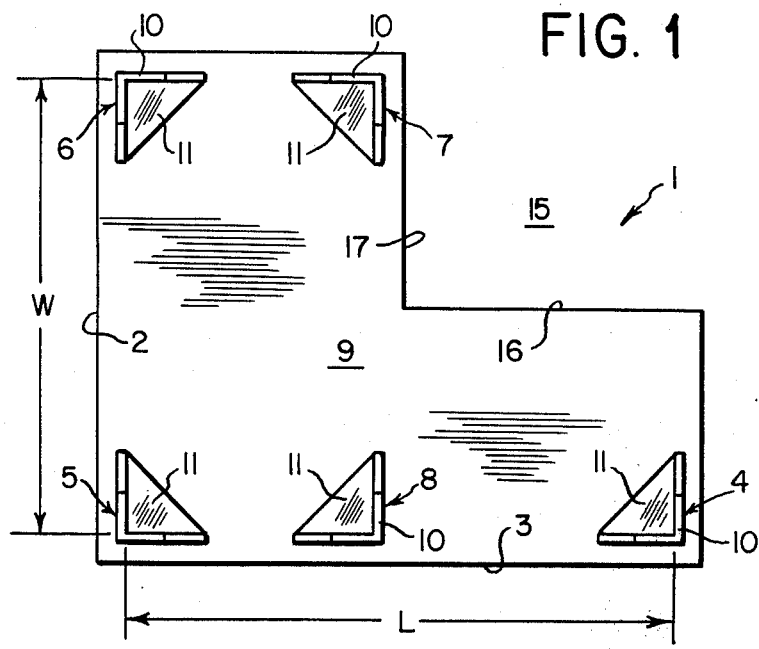
FIG. 1 is a plan view of a front side of an easel board constructed according to the invention.

Referring to FIG. 1 there is illustrated an easel board 1 having a lateral edge 2 and a longitudinal edge 3. The board 1 may comprise a metal or plastic sheet and has a plurality of front side sheet positioning means 4, 5, 6, 7 and 8 positioned on the front surface 9 thereof.

The sheet positioning means may be molded onto the board 1 if the board 1 is made of plastic or may be affixed to the board if it is made of metal. Each sheet positioning means comprises a slightly raised right angle shoulder 10 over which a flexible plastic cover 11 extends such that a corner of a sheet, not shown, may be inserted underneath the cover 11 in order that the corners of the sheet will abut against the raised shoulders 10 to firmly position and hold the corner of the sheet in place on the front surface 9 of the easel board.

Where the easel board is adapted to be used with a photo paper sheet having a longitudinal length L and a lateral width W, the board is so proportioned that its longitudinal length is greater than L and its lateral width is greater than W. Where the board is to be used with a standard 8" by 10" sheet where L=10" and W=8", the board may conveniently have a longitudinal length of 11" and a lateral width of 9".

Sheet positioning means 4 and 5 are symetrically positioned at two corners of the board 1 such that legs of the raised shoulder 10 extend parallel to edge 3 and such that the legs extending parallel to the width of the board are spaced apart a distance L from each other. Sheet positioning means 6 are positioned at the remaining corner of the board such that a leg extends parallel to the lateral edge 2 and such that it is positioned a distance W from the positioning means 5. It is apparent that a sheet of photo paper, not shown, could be positioned such that three of its corners engage into the corners of each of the sheet positioning means 4, 5 and 6. While three such sheet positioning means are included, it is apparent that any two would be sufficient to position and hold a sheet of photo paper onto the easel board and that the addition of a third positioning means further enhances holding a sheet onto the board.

The board 1 has a cut out 15 in one corner thereof wherein the longitudinal edge 16 of the cut out is substantially equal to one-half the longitudinal length of the board and where the lateral edge 17 is substantially equal to one-half the lateral width of the board. In order to insure that a margin will appear between prints made on a photo paper sheet, the edge 16 is slightly less than one-half the longitudinal length of the board and similarly the edge 17 is slightly less than the lateral width of the board. Where the board is adapted for use with a standard size 8" by 10" sheet, the edge 16 is conveniently 5 7/16" long and the edge 17 is 4 7/16" long.

When a print of substantially 4" by 5" is to be made on a photo paper sheet, the sheet is placed on the board with the sensitized surface engaging the board and with three corners of the sheet engaging paper positioning means 4, 5 and 6. The board 1 is then turned over such that the light sensitive surface of the sheet in the cut out portion may be exposed. In this manner a 4" by 5" print may be made on a sheet where the print is in the positions shown in the upper left hand corner of the sheet in FIGS. 5d, g, i and n–p. If a 4" by 5" print is to be made in the diametrically opposite or lower right-hand corner of the sheet as appears in FIGS. 5c, d, e and o, the sheet is removed from the board 1, the board is rotated 180° and the sheet replaced on the board to again engage the sheet positioning means 3, 5 and 6 where the procedure for exposing the sheet is repeated.

Figure 2:
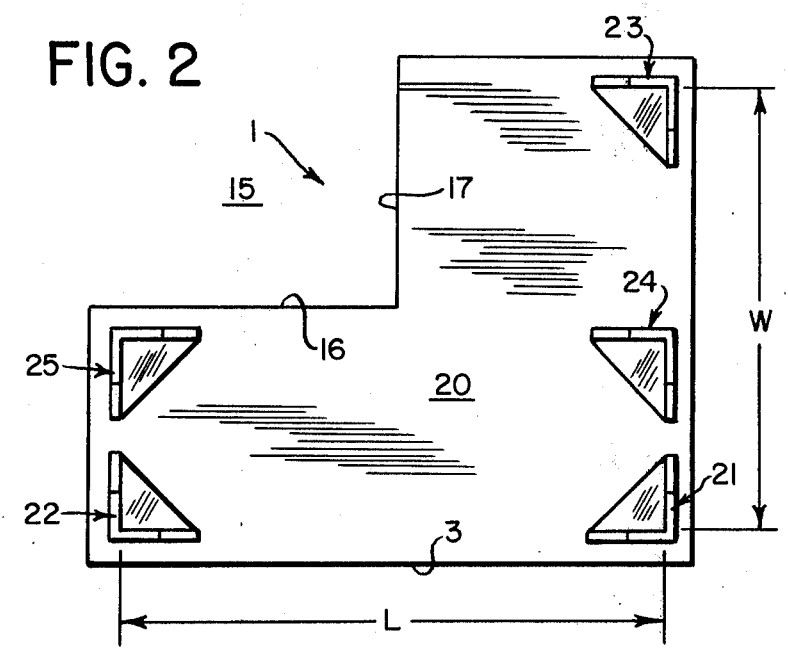
FIG. 2 is a plan view of the back side of the easel board of FIG. 1.
Figure 5:
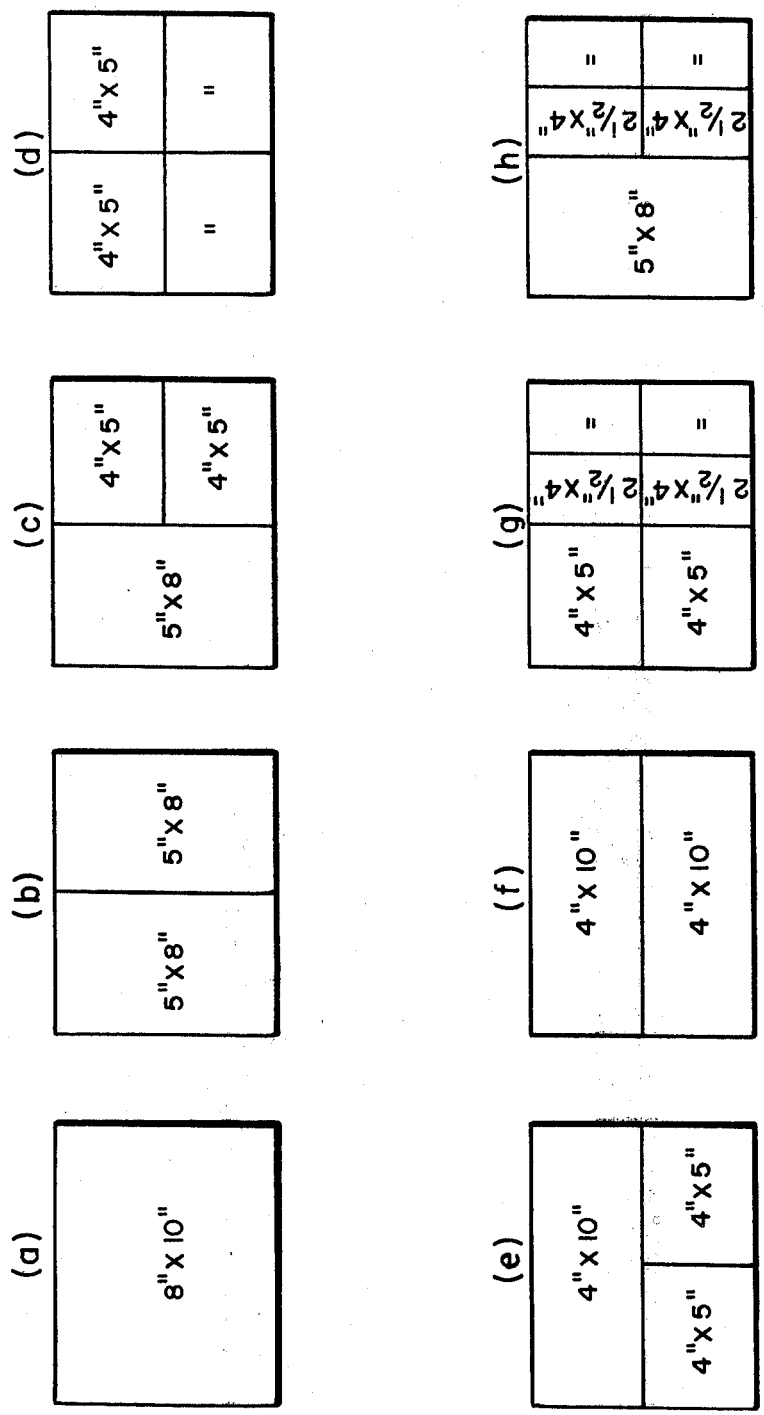
FIGS. 5a–5p are plan views of various arrangements of prints which may be made on a copy sheet utilizing the easel boards of FIGS. 1–4.

Referring to FIG. 2, the back side 20 of the board 1 is illustrated and has thereon positioning means 21, 22 and 23 positioned thereon directly opposite the positioning means 5, 4 and 6 respectively. When a print is to be made in the upper right-hand corner of the sheet as shown in FIGS. 5c, d and m–p, the sheet is inserted into the paper positioning means 20, 21 and 22 in the manner as described before and the sheet exposed. When a print is to be made in the lower left-hand portion of the sheet as shown in FIGS. 5d, e, g, l, m and p, the board is rotated 180° and the sheet is placed in the positioning means 21, 22 and 23 and again exposed.

Referring back to FIG. 1, further front side sheet positioning means 7 and 8 are spaced apart in the lateral direction a distance W and are spaced from the lateral edge 2 of the board a distance substantially equal to one-half the longitudinal length of the board and more exactly, a distance slightly greater than one-half the longitudinal length of the board. On a board adapted for use with an 8" by 10" sheet, this distance may be 5 1/16". This arrangement of the further front side sheet positioning means allows prints to be made having a dimension of substantially 5" by 8".

When a 5" by 8" print is to be made on the left side portion of a sheet as shown in FIGS. 5b, c and h, a sheet is positioned with two of its corners engaging the further front side sheet positioning means 7 and 8 such that a portion of the sheet overlies the left end of the board shown in FIG. 1 and such that it overlies the positioning means 5 and 6. The board is then turned over so as to expose the sensitized portion of the sheet extending over the side of the board. The various sheet positioning means on the board have a limited height so that a sheet will not be materially bent when it overlies the positioning means.

When a 5" by 8" print is to be made on the right side of the sheet as appears in FIG. 5b, the sheet is turned 180° and inserted to engage the further front side sheet positioning means 7 and 8 and exposed in the manner described above.

Referring to FIG. 2, there is illustrated the back side 20 of the board 1 having further back side positioning means 24 and 25 thereon which are spaced apart a distance L and spaced from the edge 3 by a distance slightly greater than one-half the lateral width of the board. When the board is adapted for use with an 8" by 10" sheet, this distance may be 4 9/16".

When a 4" by 10" print is to be made on the top portion of a sheet as illustrated in FIGS. 5e, f, k and l, the bottom of a sheet is positioned such that its bottom corners engage the further back side positioning means 24 and 25 and so that a lower half extends over the edge 3 of the board. The board is then turned over so as to expose the portion of the sheet uncovered by the board. When the 4" by 10" print is to appear on the lower portion of a print as shown in FIG. 5f, the top of the sheet is positioned to engage positioning means 24 and 25 and the sheet is then exposed as explained above.

Figure 3:
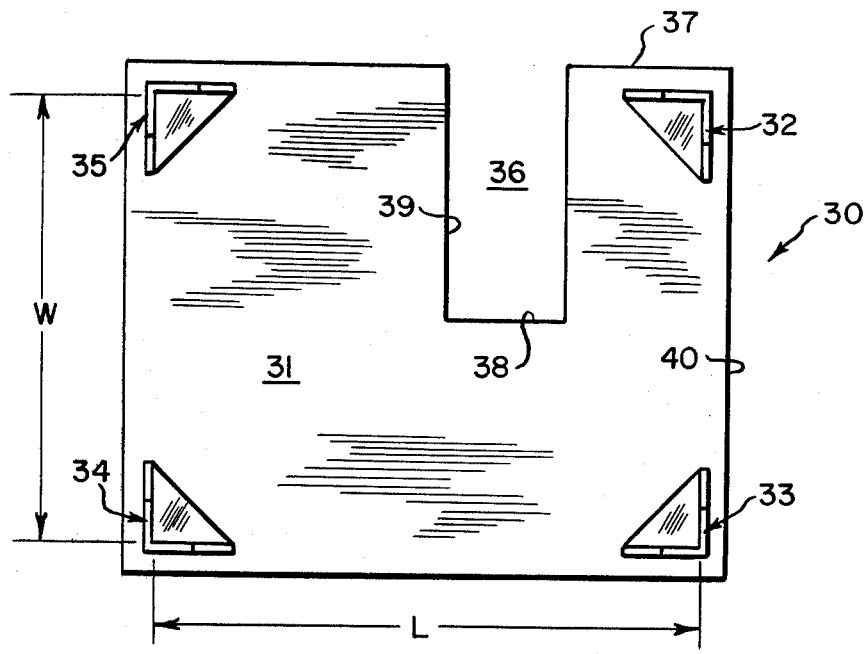
FIG. 3 is a plan view of the front side of a further easel board constructed according to the invention.

Referring to FIG. 3 there is illustrated an easel board 30 having a front side 31 and including thereon front side positioning means 32, 33, 34 and 35 which are of the same construction as the sheet positioning means associated with board 1. The board 30 has the same general overall dimensions as the board 1, namely that where the board is to be used to make prints from a sheet having a standard size of 8" by 10" the lateral width of the board is slightly greater than W and the longitudinal length of the board is slightly greater than L. The positioning means 33 and 34 are separated from positioning means 32 and 35 a distance W and the positioning means 32 and 33 are separated from the positioning means 34 and 35 a distance L. A cut out 36 is included along a longitudinal edge 37 of the board where the edge 38 of the cut out extending parallel to the longitudinal edge 37 is equal to substantially one-quarter the longitudinal length of the board and where the edge 39 of the cut out extending parallel to the lateral edge 40 of the board is approximately one-half of the lateral width of the board. Where the board is to be used with an 8" by 10" sheet and to make 2½" by 4" prints, the dimension of the edge 38 is preferably 2 6/16" and the edge 39 is preferably 4 6/16". Edge 39 is positioned 5 6/16" from the lateral edge 40 of the board.

The back of the board 30, not shown, includes further rear side sheet positioning means, also not shown, which are positioned directly opposite positioning means 32-35.

When a 2¼" by 4" print is to be made in an upper left portion of a sheet as appears in FIGS. 5j, and m, a sheet is inserted with the sensitive side engaging the front surface 31 of the board such that the top corners of the sheet engage the positioning means 32-34. The board 30 is then turned over to expose the sheet. When the print is to be in a lower right portion of the sheet as shown in FIGS. 5g, h, i, j, k, l, m, n and p, the board is rotated 180°, the top of the sheet placed in positioning means 33 and 34 and then exposed as described above.

When a 2¼" by 4" print is to be made in the upper right portion of a sheet as appears in FIGS. 5g, h, i and j, the top corners of the sheet are positioned in the positioning means on the back of the board 40 on either side of the cut out 36, not shown. The sheet is then exposed in the manner described previously. Where a 2¼" by 4" print is to be in the lower left portion of a sheet as shown in FIGS. 5i, j, k, n and o, the board is rotated 180° such that the bottom corners of the sheet may then be positioned by the positioning means on the back of the board on either side of the cut out.

Figure 4:
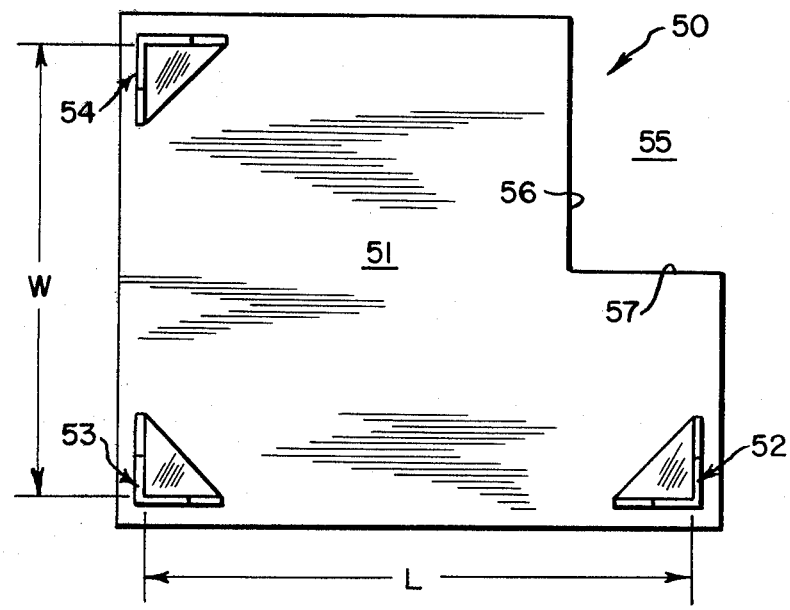
FIG. 4 is a plan view of a front side of a still further easel board constructed according to the invention.

Referring to FIG. 4 there is illustrated a still further board 50 having a front side 51. The board 50 has the same overall dimensions as boards 1 and 40, namely that the longitudinal length of the board is greater than L and the lateral width of the board is greater than W where the board is to be used to make prints from a standard sheet of photo paper having dimensions of L times W. Positioning means 52, 53 and 54 are included on the front side of the board and similar positioning means, not shown, are included on the back side of the board. Positioning means 53 and 54 are separated a distance W from each other while positioning means 53 and 52 are separated a distance L from each other. A cut out 55 is included in one corner of the board 50 where the edge 56 of the cut out extending in the lateral direction is substantially equal to one-half the lateral width of the board and where the edge 57 extending in the longitudinal direction is substantially equal to one-quarter the lateral length of the board. In a board designed for making 2¼" by 4" prints from an 8" by 10" sheet, edge 57 is more exactly 2 14/16" and edge 56 is 4 6/16".

Where a 2¼" by 4" print is to be made in an upper left-hand corner of a sheet as shown in FIGS. 5j and m, the bottom of the sheet is positioned by positioning means 52 and 53 with the light sensitive side engaging the top surface 51 of the board 50. The board is then turned over and the sheet exposed. When a print is to be made in the lower right-hand corner of a sheet as shown in FIGS. 5h, i, j, k, l, m, n and p, the board is rotated 180° and the top corners of the sheet positioned by positioning means 52 and 53 after which the sheet is exposed. Prints are made in the upper right corners as shown in FIGS. 5h, i and j by applying the sheet to the back of board 50 so that a top portion of the sheet is positioned by the back side positioning means, not shown, so as to extend over the cut out 55. Prints in the lower left corner of the sheet as shown in FIGS. 5i, j, k, n and o are made by turning the board 180° and applying the sheet to the back side of the board so that the positioning means position a bottom portion of the sheet over the cut out 55.

It is thus seen that by utilizing the three easel boards of my invention that a plurality of different size prints may be made from a single sheet of photo paper shown in FIG. 5a having standard dimensions. As described, all of the sheet is utilized thus preventing any waste and subsequent increase in printing cost. The boards themselves are sturdy and easy to manipulate in the restricted lighting conditions as occurs in a darkroom. Further the use of the board without moving parts, such as shutters or flaps, allows the back of the sheet of photo paper to be readily marked with a waterproof crayon so that identifying information may be marked on the back of each print immediately prior to or after it has been exposed. Such information may include, for example, exposure time, film type and dates. This is of particular advantage when a series of test patches are made where the same picture may be imaged a number of times on a sheet under varying exposure times to produce the desired shadings.

I claim:

1. A rectangular shaped easel board for use with a sheet of photo paper having a longitudinal length L and a lateral width W, said board having a longitudinal length greater than L and a lateral width greater than W and including a cut out in one corner thereof equal to substantially one-half the longitudinal length of the board times substantially one-half the lateral width of the board and having on a front side of the board at least two front side sheet positioning means situated at two of the uncut corners of the board and adjacent either the lateral edge of the board or the longitudinal edge of the board and when adjacent the lateral edge of the board separated a distance W from one another and when adjacent the longitudinal edge of the board separated a distance L from one another whereby a corner of the sheet having a dimension substantially one-half W times substantially one-half L may be exposed when said sheet is positioned on the front side of said board by said front side sheet positioning means.

2. A rectangular shaped easel board according to claim 1 wherein the dimensions of said cut out are slightly less than one-half the longitudinal length of the board times slightly less one-half the lateral width of the board.

3. A rectangular shaped easel board according to claim 1 having in addition two further front side sheet positioning means on the front side of the board spaced apart a distance W from each other and spaced from the lateral edge of the board opposite the cut out a distance substantially equal to one-half L whereby an end of said sheet having the dimensions W times substantially one-half L may be exposed when said sheet is positioned by said further front paper sheet positioning means.

4. A rectangular shaped easel board according to claim 3 wherein said further front side sheet positioning means are spaced from the lateral edge of the board opposite the cut out a distance slightly greater than one-half L.

5. A rectangular shaped easel board according to claim 1 or 3 having on the back side of the board at least two back side sheet positioning means positioned opposite said front side sheet positioning means whereby a corner of a sheet having a dimension substantially one-half W times substantially one-half L may be exposed when said sheet is positioned on the back side of said board by said back side sheet positioning means.

6. A rectangular shaped easel board according to claim 5 having in addition two further back side sheet positioning means on the back side of the board spaced apart a distance L and spaced from the longitudinal edge of said board opposite said cut out substantially a distance one-half W whereby an end of a sheet having the dimension L times substantially one-half W may be exposed when said sheet is positioned on the back side of said board by said further back side sheet positioning means.

7. A rectangular shaped easel board according to claim 6 wherein said further back side sheet positioning means are spaced from the longitudinal edge of the board opposite the cut out a distance slightly greater than one-half W.

8. A rectangular shaped easel board for use with a sheet of photo paper having a longitudinal length L and a lateral width W, said board having a longitudinal length greater than L and a lateral width greater than W and including a cut out in one corner thereof equal to substantially one-quarter the longitudinal length of the board times substantially one-half the lateral width of the board and having on each of the front and back sides of the board at least two sheet positioning means situated at two of the uncut corners of the board and adjacent either the lateral edge of the board or the longitudinal edge of the board and when adjacent the lateral edge of the board separated a distance W from one another and when adjacent the longitudinal edge of the board separated a distance L from one another whereby a corner of a sheet having a dimension substantially one-half W times substantially one-quarter L may be exposed when said sheet is positioned on said board by said sheet positioning means.

9. A rectangular shaped easel board according to claim 8 wherein the dimensions of said cut out are slightly less than one-quarter the longitudinal length of the board times slightly less than one-half the lateral width of the board.

10. A rectangular shaped easel board for use with a sheet of photo paper having a longitudinal length L and a lateral width W, said board having a longitudinal length greater than L and a lateral width greater than W and including a cut out along one longitudinal edge of said board equal to substantially one-quarter of the longitudinal length of the board times substantially one-half the lateral width of the board and having on each of the front and back sides of the board at least two sheet positioning means situated at two corners of the board and adjacent either the lateral edge of the board or the longitudinal edge of the board and when adjacent the lateral edge of the board separated a distance W from one another and when adjacent the longitudinal edge of the board separated a distance L from one another whereby a portion of the sheet having a dimension of substantially one-half W times substantially one-quarter L may be exposed when said sheet is positioned on said board by said sheet positioning means.

11. A rectangular shaped easel board according to claim 9 wherein the dimensions of said cut out are slightly less than one-quarter the longitudinal length of the board times slightly less than one-half the lateral width of the board.

* * * * *